(12) United States Patent
Bonin (10) Patent No.: US 12,157,507 B2
(45) Date of Patent: Dec. 3, 2024

(54) METHOD FOR CONTROLLING WHEEL DEFORMATION AND ASSOCIATED DEVICE AND SYSTEM

(71) Applicant: ALSTOM Holdings, Saint-Ouen-sur-Seine (FR)

(72) Inventor: Eric Bonin, Jardin (FR)

(73) Assignee: ALSTOM Holdings, Saint-Ouen-sur-Seine (FR)

( * ) Notice: Subject to any disclaimer, the term of this patent is extended or adjusted under 35 U.S.C. 154(b) by 888 days.

(21) Appl. No.: 17/119,929

(22) Filed: Dec. 11, 2020

(65) Prior Publication Data

US 2021/0179152 A1    Jun. 17, 2021

(30) Foreign Application Priority Data

Dec. 13, 2019 (FR) .................................... 19 14413

(51) Int. Cl.

| | |
|---|---|
| *B61K 9/12* | (2006.01) |
| *B60B 17/00* | (2006.01) |
| *B61L 15/00* | (2006.01) |
| *G01B 7/16* | (2006.01) |
| *G01B 7/28* | (2006.01) |
| *G01B 11/16* | (2006.01) |
| *G01M 17/10* | (2006.01) |
| *G01P 3/36* | (2006.01) |
| *G01P 3/44* | (2006.01) |
| *B61L 25/02* | (2006.01) |

(52) U.S. Cl.
CPC ................ *B61K 9/12* (2013.01); *B60B 17/00* (2013.01); *B61L 15/0081* (2013.01); *G01B 7/16* (2013.01); *G01B 7/282* (2013.01); *G01B 11/16* (2013.01); *G01M 17/10* (2013.01); *G01P 3/36* (2013.01); *G01P 3/44* (2013.01); *B61L 25/021* (2013.01)

(58) Field of Classification Search
CPC ....... B61K 9/12; B60B 17/00; B61L 15/0081; B61L 25/021; G01B 7/16; G01B 7/282; G01B 11/16; G01M 17/10; G01P 3/36; G01P 3/44
See application file for complete search history.

(56) References Cited

U.S. PATENT DOCUMENTS

| | | | |
|---|---|---|---|
| 4,815,004 A | 3/1989 | Beebe | |
| 11,148,689 B2 * | 10/2021 | Worden | .................... B61C 9/50 |
| 2003/0160133 A1 | 8/2003 | Moretti et al. | |
| 2018/0297619 A1 * | 10/2018 | Worden | .............. B61L 15/0081 |

FOREIGN PATENT DOCUMENTS

| | | | | |
|---|---|---|---|---|
| EP | 1197416 A2 * | 4/2002 | ............... B61K 9/04 |
| EP | 1559625 A1 | 8/2005 | | |

OTHER PUBLICATIONS

French Search Report for French Patent Application No. FR 19 14413, dated Aug. 27, 2020 in 2 pages.

* cited by examiner

*Primary Examiner* — Zachary L Kuhfuss
(74) *Attorney, Agent, or Firm* — KNOBBE, MARTENS, OLSON & BEAR LLP (57) ABSTRACT

A method for controlling the deformation of a wheel includes obtaining, for multiple predefined angular positions on the wheel, a parameter characterizing an angular velocity of the wheel when the wheel is in contact with the running surface at each predefined angular position while the wheel is rolling on a running surface, and calculating a radius value of the wheel for each predefined angular position using the parameter characterizing the angular velocity obtained for that angular position.

12 Claims, 7 Drawing Sheets

METHOD FOR CONTROLLING WHEEL DEFORMATION AND ASSOCIATED DEVICE AND SYSTEM

CROSS-REFERENCE TO RELATED APPLICATIONS

This application is a U.S. non-provisional application claiming the benefit of French Application No. 19 14413, filed on Dec. 13, 2019, which is incorporated herein by reference in its entirety.

FIELD

The invention relates to controlling wheel deformation.

BACKGROUND

Document EP 1 559 625 presents a method for controlling the deformation of a wheel of a railway vehicle, comprising a step of obtaining the variation of the duty cycle of a gearwheel during its rotation, with the data making it possible to obtain these variations being measured by a sensor to which a wheel deformation controlling device is connected. The cyclic ratio is the time ratio during which the sensor is in front of the head of a gearwheel tooth to the time during which the sensor is in front of the head of the gearwheel tooth plus the time during which the sensor is in front of the groove preceding or following that gearwheel. The time variations in the duty cycle enable the relative deformations of the controlled wheel to be determined.

However, such a deformation controlling method only enables the relative deformation of the wheel being controlled to be determined and only provides partial knowledge of the condition of the wheel, which is not entirely satisfactory for ensuring the safety of the rail vehicle operations.

SUMMARY

To this end, the invention relates to a method for controlling the deformation of a wheel, with the method comprising the following steps:
while the wheel is rolling on a running surface, obtaining, for multiple predefined angular positions on the wheel, a parameter characterizing a wheel angular velocity when the wheel is in contact with the running surface at said predefined angular position; and
calculation of a wheel radius value for each predefined angular position by using the parameter characterizing the angular velocity obtained for said angular position.

Thus, the wheel deformation controlling method not only makes it possible to determine the deformations of a wheel, but also to quantify these deformations and to evaluate the actual shape of the wheel.

Depending on other advantageous aspects of the invention, the wheel deformation controlling method includes one or more of the following features, taken alone or in any technically possible combination:
the parameter characterizing the angular speed of the wheel is measured by a sensor, with the sensor comprising a gearwheel and a sensing element configured to detect one edge of each tooth of the gearwheel;
the parameter characterizing the angular velocity of the gear is a direct time difference for the predefined angular position, with the direct time difference being the time difference between the detection of the edge of two gearwheel teeth, with the two teeth preferably being two consecutive teeth of the gearwheel;
the calculation of a wheel radius value for each predefined angular position uses a filtered time difference, with the filtered time difference being a weighted average of direct time differences for multiple predefined angular positions;
the filtered time difference is calculated by weighting the direct time differences for multiple predefined angular positions by a Hann window;
the calculation of a wheel radius value for each predefined angular position is the product of an average wheel radius and the ratio between the direct time difference and the filtered time difference obtained for said predefined angular position;
the method comprises calculating at least four wheel radius values for each predefined angular position, wherein a consolidated wheel radius value for each predefined angular position is calculated using at least four wheel radius values calculated for each predefined angular position.

The invention also relates to a device for controlling a wheel deformation, with the device being adapted to be connected to a sensor, configured to obtain, while the wheel is rolling on a running surface, for multiple predefined angular positions on the wheel, a parameter characterizing an angular velocity of the wheel when the wheel is in contact with the running surface at said predefined angular position, with the device comprising a module for calculating a wheel radius value for each predefined angular position using the parameter characterizing the angular velocity obtained for said angular position.

The invention furthermore relates to a wheel deformation controlling system, in particular intended to be fitted onboard a railway vehicle, with the wheel deformation controlling system comprising a sensor and a wheel deformation controlling device connected to the sensor, with the wheel deformation controlling device being a device as mentioned above.

The invention also relates to a vehicle, in particular a railway vehicle, comprising at least one wheel and a wheel deformation controlling system as mentioned above.

BRIEF DESCRIPTION OF THE DRAWINGS

The features and advantages of the invention will become clearer when reading the following description, given only as a non-exhaustive example with reference to the attached drawings, in which.

DETAILED DESCRIPTION

In the following description, a direct orthonormal base (X, Y, Z) is considered. The elevation direction, Z, is defined according to the height of the vehicle and corresponds, for example, to the vertical direction when the vehicle is on a horizontal track. The longitudinal direction, X, corresponds to the forward/rearward direction of the vehicle and the transverse direction, Y, corresponds to the width of the vehicle.

The terms "upper" and "lower" as well as "high" and "low" are defined in relation to the elevation direction, Z. The terms "left" and "right" are defined in relation to the transverse direction, Y, in the normal direction of travel of the vehicle.

Figure 1:
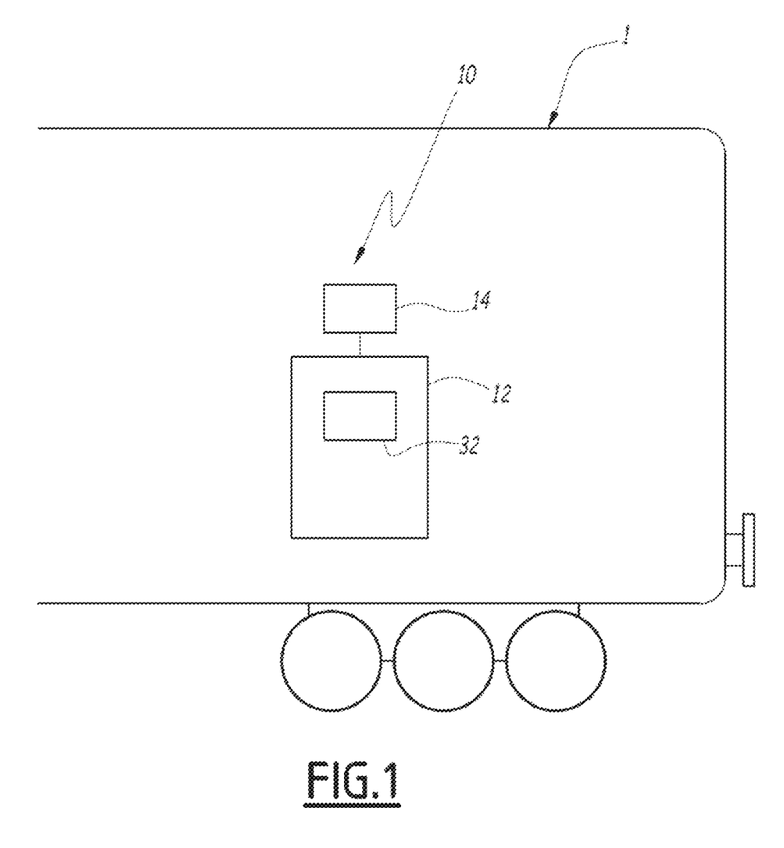
FIG. 1 is a schematic representation of a railway vehicle equipped with a wheel deformation controlling system comprising a sensor and a wheel deformation controlling device according to the invention.

The wheel deflection controlling system 10, shown schematically in FIG. 1, is intended for use on a rail vehicle 1 and is designed to evaluate the radius of a wheel 4 in multiple angular positions.

Railway vehicle 1 is a locomotive, wagon or railcar, for example.

Figure 2:
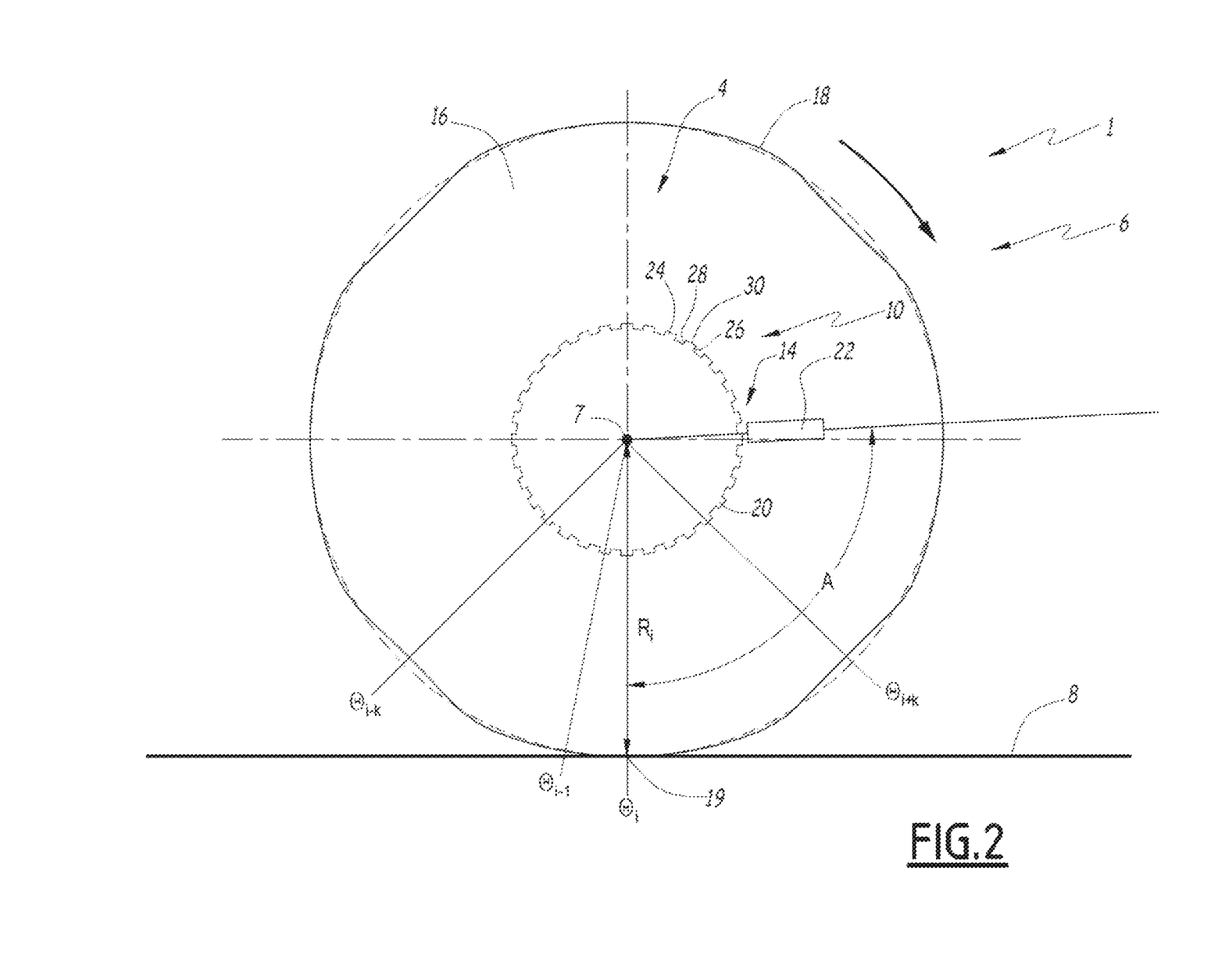
FIG. 2 is a schematic representation of a wheel equipped with a wheel deformation controlling system comprising a sensor and a wheel deformation controlling device according to the invention.

Railway vehicle 1 comprises an axle 6, where axle 6 comprises the wheel, 4, and a shaft, 7 (FIG. 2). Wheel 4 is rotatable around a Y-Y axis of shaft 7.

When rail vehicle 1 is running on a track, wheel 4 is supported and runs on a running surface 8.

The wheel deformation controlling system 10 comprises a wheel deformation controlling device 12 and a sensor 14 for measuring a parameter characterizing the angular velocity of wheel 4 (FIG. 1).

As shown in FIG. 2, the wheel has a rim 16 and a tread 18. The rim 16 connects shaft 7 to the tread 18. Tread 18 is intended to rest and run on the running surface 8 at a contact point 19.

Wheel 4 has multiple predefined angular positions. In particular, the wheel consists of n predefined angular positions $\theta_i$ with i between 1 and n. A wheel radius $R_i$ is associated with each angular position $\theta_i$.

Sensor 14 comprises a gearwheel 20 and a sensing element 22. The sensor 14 is an antiskid system component, for example.

Gearwheel 20 is rotatable around the Y-Y axis of shaft 7. Gearwheel 20 is rotationally fixed to wheel 4. The gearwheel 20 comprises multiple teeth 24, evenly spaced circumferentially around the Y-Y' axis. In particular, gearwheel 20 has a number of teeth 24 greater than or equal to the number n of predefined angular positions. In a particular embodiment described here, the gearwheel has a number of teeth 24 equal to the number n of predefined angular positions. Each tooth 24 consists of a front face 26, a rear face 28 and a head 30 connecting the front face 26 to the rear face 28.

The sensing element 22 is suitable for detecting the passage of teeth 24 of the gearwheel 20 when the gearwheel 4 rotates. For example, the sensing element 22 is positioned opposite the toothed edge of the gearwheel.

The sensing element 22 detects the passage of the teeth magnetically. In an alternative embodiment, the sensing element 22 detects the passage of the teeth optically.

The sensing element 22 is suitable for detecting the tooth edge 24 of the gearwheel. In particular, sensing element 22 is suitable for detecting the leading edge 26 and/or trailing edge 28 of the gear teeth 24. In the embodiment shown here, the sensing element 22 is adapted to detect the leading edge 26 of the teeth 24.

Figure 3:
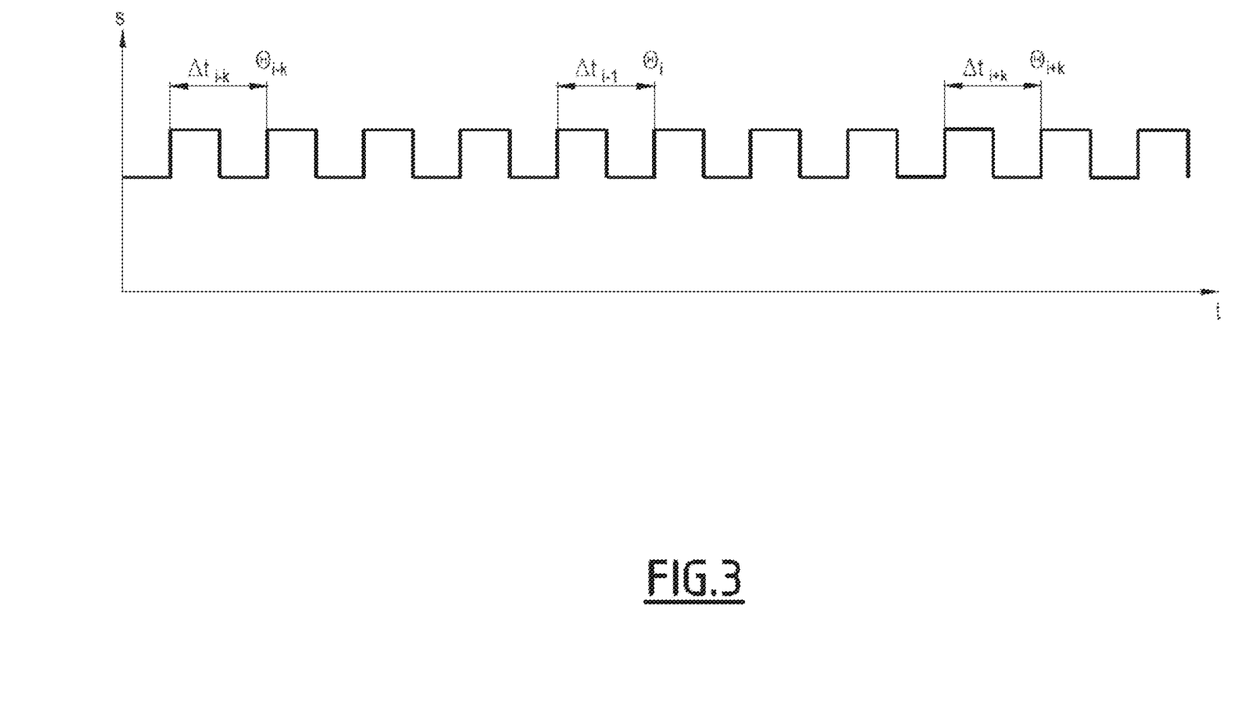
FIG. 3 is a schematic representation of the time evolution of the signal generated by the sensor.

For example, the sensing element generates a signal s over time, as shown in FIG. 3.

Sensing element 22 of sensor 14 is configured to obtain, while wheel 4 is rolling on the running surface 8, and for each angular position $\theta_i$, a parameter characterizing the angular velocity of wheel 4 when the wheel is in contact with the running surface through said predefined angular position. More particularly, sensing element 22 of sensor 14 is angularly offset from the portion 19 of the wheel in contact with the ground by an angle A. The angular velocity measured for the leading edge of the tooth located at $\theta_i$-A thus characterises the angular velocity of the wheel when it is in contact with the running surface by the position $\theta_i$, as shown in FIG. 2.

In particular, sensing element 22 is configured to obtain a direct time difference $\Delta T_i$ for each angular position $\theta_i$. The parameter characterizing the angular velocity of the wheel 4 for an angular position $\theta_i$ is then the direct time difference $\Delta T_i$.

The direct time difference $\Delta T_i$ is the time difference between the detection of the leading edge 26 of two teeth 24 of the gearwheel. The direct time difference $\Delta T_i$ in the embodiment shown is the time difference between the detection of the leading edge of two consecutive teeth of the gearwheel, in particular the time difference between the detection of the leading edge 26 of two consecutive teeth of the gearwheel. The direct time difference $\Delta T_i$ is then the time difference between the detection of the tooth edge located at the angular position $\theta_i$-A and the detection of the immediately preceding tooth edge. If there are as many teeth 24 as there are positions $\theta_i$, this direct time difference $\Delta T_i$ thus corresponds to the time difference between the transition from the angular position $\theta_i$ to the contact point 19 and the transition from the angular position $\theta_i$-1 to the contact point.

Figure 5:
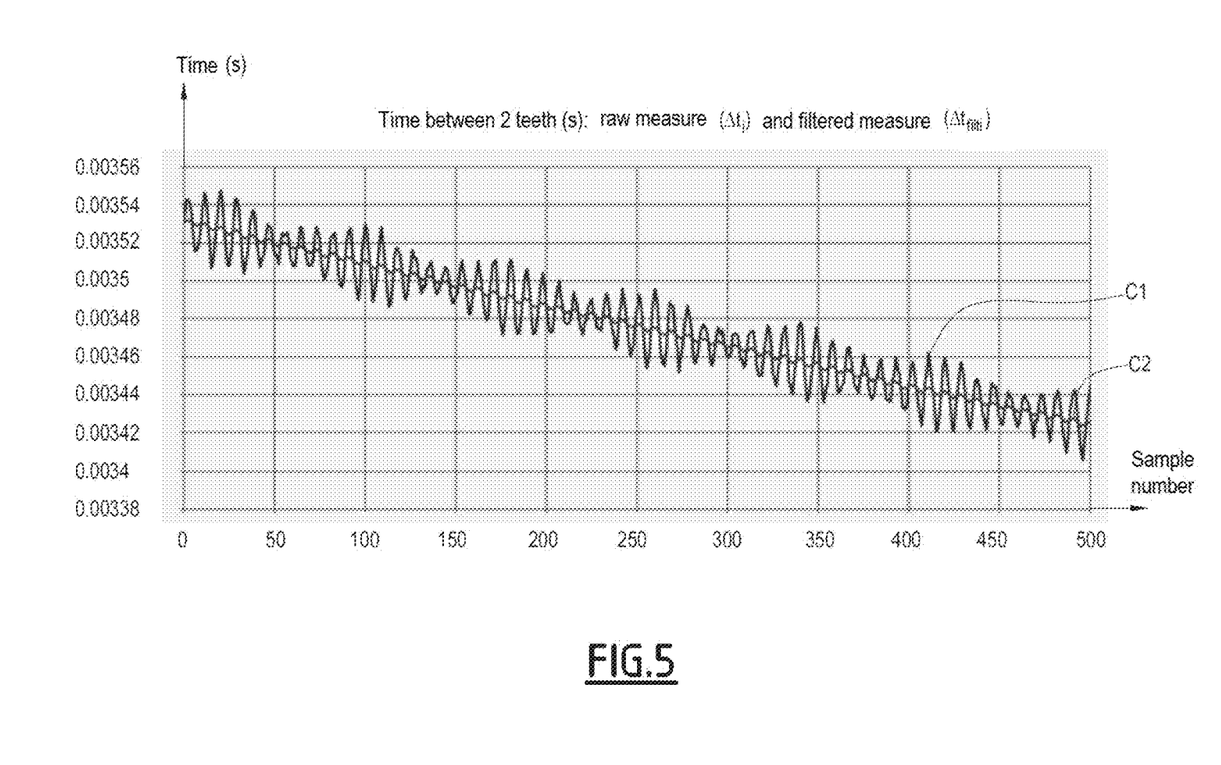
FIG. 5 is an example of the evolution of a signal generated by the sensor representing the measurement of time between two successive teeth of a sensor gearwheel shown in FIG. 2, as a function of a measurement sample number.

An example of the measurement of the time between two successive teeth 24 by the sensing element 22 is shown in FIG. 5, which represents the time between two successive teeth 24 as a function of a measurement sample number (each measurement sample is associated with an angular position $\theta_i$). In FIG. 5, a first curve C1 represents the measurement of the direct time difference $\Delta T_i$ between two successive teeth 24 and a second curve C2 represents a filtered time difference $\Delta T_{filti}$, the calculation of which is described below, for a train travelling at 40 km/h with slight acceleration, a wheel with a nominal diameter of 1 metre and a number of gear teeth 24 equal to 80.

The deformation controlling device for wheel 10 includes a calculation module 32.

The calculation module 32 is configured to calculate the value of the wheel radius R for each predefined angular position $\theta_i$ using the parameter characterizing the angular velocity obtained for the predefined angular position. In particular, the calculation module is configured to calculate the value of the wheel radius $R_i$ for the position $\theta_i$ using the direct time difference $\Delta T_i$ associated with the angular position $\theta_i$.

The calculation module 32 is further configured to calculate the value of the wheel radius $R_i$ for the predefined angular position $\theta_i$ using the filtered time difference $\Delta T_{filti}$ shown in FIG. 5, associated with the predefined angular position $\theta_i$. The filtered time difference $\Delta T_{filti}$ associated with the predefined angular position θi corresponds to a weighted average of direct time differences $\Delta T_i$ for multiple predefined angular positions θi.

Figure 4:
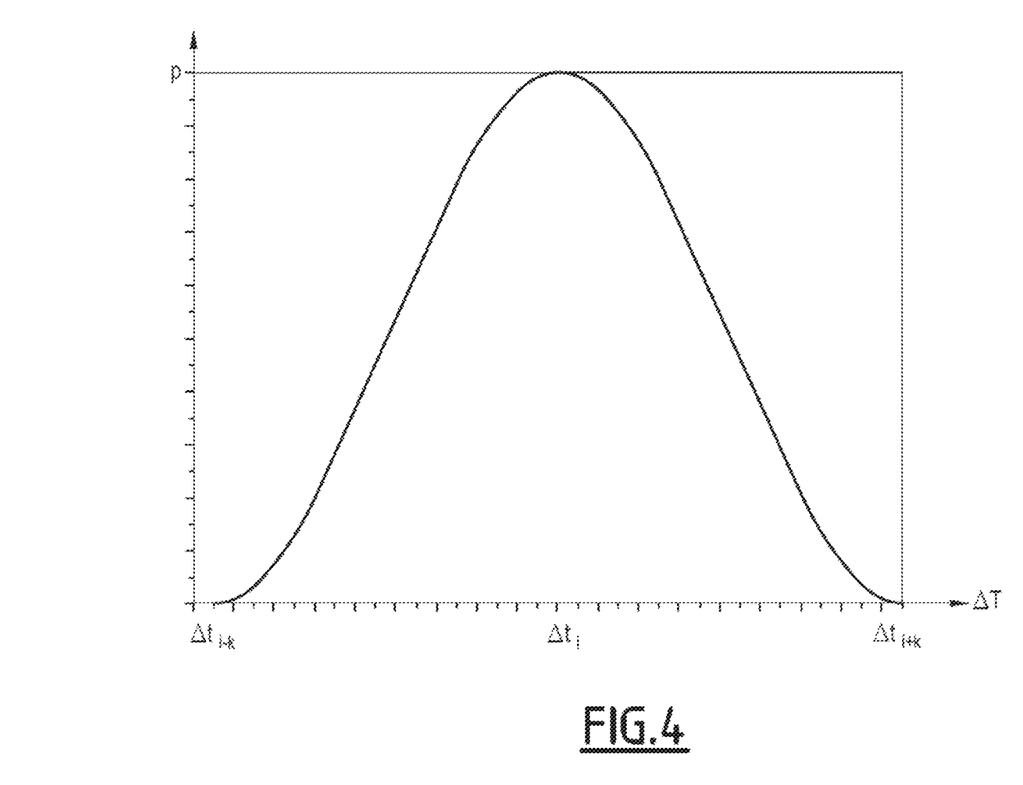
FIG. 4 is an example of a weighting window used in the wheel deformation controlling method.

The calculation module 32 is configured, for example, to calculate the filtered time difference $\Delta T_{filti}$ by weighting the direct time differences $\Delta T_i$ for multiple predefined angular positions by a Hann window. Such a weighting window can be seen, for example, in FIG. 4, where p is a weighting coefficient. In particular, the calculation module 32 is configured to perform a weighted average of the k direct time differences whose angular position precedes the predefined angular position $θ_i$ and of the k direct time differences whose angular position follows the predefined angular position, with k a natural number less than half of n. In other words, the filtered time difference $\Delta T_{filti}$ for a predefined angular position $θ_i$ is calculated using the direct time differences $\Delta T_i$ for angular positions between $\Delta T_i$-k and $θ_i$+k. In particular, and in the preferred embodiment, k is the natural number closest to one eighth of the number of teeth n. The filtered time difference $\Delta T_{filti}$ is thus calculated using the direct time differences $\Delta T_i$ associated with the angular positions $θ_i$ included on the quarter gearwheel surrounding the predefined angular position $θ_i$.

Alternatively, a rectangular window or a Hamming window or a Blackman window can be used instead of the Hann window.

The calculation module 32 is configured to calculate the value of wheel radius $R_i$ of wheel 4 for each predefined angular position as the product of a predetermined wheel radius, for example an average wheel radius $R_m$, and the ratio between the direct time difference $\Delta T_i$ and the filtered time difference $\Delta T_{filti}$ obtained for said predefined angular position $θ_i$. The calculation module is configured to calculate the $R_i$ value of wheel 4 for each predefined angular position with the following equation.

$$R_i = R_m \cdot \frac{\Delta T_i}{\Delta T_{filti}} \quad \text{[Math 1]}$$

Figure 6:
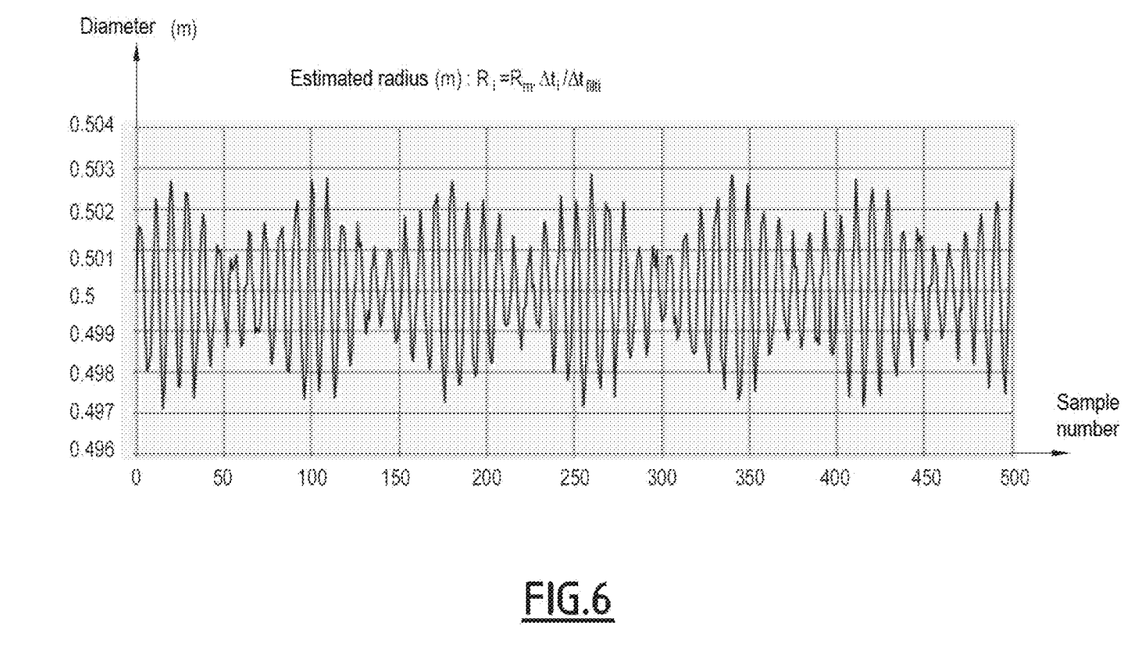
FIG. 6 is an example of the evolution of a signal generated by the sensor as a function of the signal generated in FIG. 5, representing the value of the wheel radius as a function of the sample number.

An example of the value of the estimated radius for the direct time difference and the filtered time difference for the case of the curves shown in FIG. 5 for a train running at km/h with slight acceleration, a wheel with a nominal diameter of 1 meter and a number of gear teeth 24 equal to 80 is given by the graph shown in FIG. 6, showing the value of the estimated radius as a function of the sample number.

Figure 7:
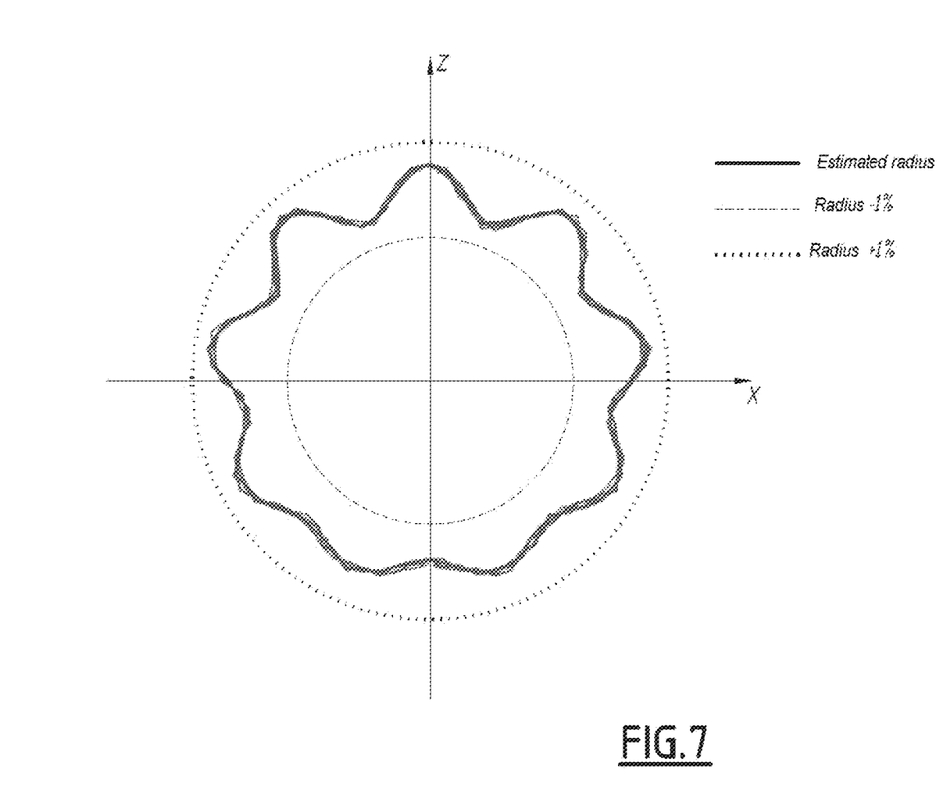
FIG. 7 is a schematic representation of the wheel deformation obtained from the signal generated in FIG. 6.

FIG. 7 shows the wheel deformation obtained from the graph in FIG. 6, with multiple wheel revolutions superimposed, to eliminate measurement noise. In this example, a facet type wheel deformation is observed.

A method for controlling the deformation of a wheel according to the invention will now be presented. The previously described wheel deformation controlling system 10 is specially adapted to implement the method now presented. The method now presented is further specially adapted to be implemented by the previously described wheel deformation controlling system 10.

The method includes a step of obtaining the parameter characterizing the angular velocity of the wheel for the plurality of predefined angular positions θ, followed by a step of calculating a value of radius Ri of wheel 4 for each predefined angular position i.

The obtaining step comprises obtaining, for the multiple predefined angular positions $θ_i$ on the wheel, while wheel 4 is rolling on the running surface 8, a parameter characterizing an angular velocity of the wheel, when wheel 4 is in contact with the running surface 8 through said predefined angular position $θ_i$.

The obtaining step is implemented in particular when the rail vehicle is running at a substantially constant speed on running surface 8. The obtaining step is preferably carried out when wheel 4 is running on running surface 8 without slipping.

The obtaining step includes the measurement by the sensor 14 of the parameter characterizing the angular speed of wheel 4.

During the obtaining step, sensor 14 successively measures the direct time difference $\Delta T_i$ for each predefined angular position $θ_i$. The direct time difference $\Delta T_i$ is measured in particular when a predefined angular position $θ_i$ is in contact with the running surface 8, or in other words when the sensing element 22 detects the leading edge 26 of a tooth 24 at a position $θ_i$-A angularly offset from the position $θ_i$ by angle A. The time difference $\Delta T_i$ is then the time between the detection of the leading edge 26 of tooth 24 at the position $θ_i$-A and the detection of the leading edge 26 of the preceding tooth 24.

After obtaining the direct time difference values $\Delta T_i$, a radius value $R_i$ for each angular position $θ_i$ is calculated in the calculation step. The calculation step is carried out in particular by calculation module 32.

The calculation of each wheel radius $R_i$ uses the direct time difference $\Delta T_i$ obtained for each angular position $θ_i$. The calculation of each wheel radius $R_i$ for the predefined angular position $θ_i$ also uses the filtered time difference $\Delta T_{filti}$, where the filtered time difference is a weighted average of direct time differences $\Delta T_i$ for multiple predefined angular positions $θ_i$. In particular, the filtered time difference $\Delta T_{filti}$ is calculated as a weighted average of the direct time differences $\Delta T$; for multiple predefined angular positions through a Hann window.

According to a particular embodiment, the obtaining step may extend over several wheel revolutions, for example. The obtaining step extends advantageously over at least 4 turns of the wheels. For each wheel revolution, a direct time difference $\Delta T_i$ is obtained for a predefined angular position $θ_i$. The direct time difference $\Delta T_i$ for one wheel revolution is used to calculate a filtered time difference $\Delta T_{filti}$ for one wheel revolution and a wheel radius $R_i$ for one wheel revolution for a predefined angular position $θ_i$.

The wheel deformation controlling method thus includes the calculation of at least four wheel radius values $R_i$ for each predefined angular position $θ_i$, in the calculation step The calculation step includes calculating a consolidated wheel radius value $R_{ic}$ for each predefined angular position, with the consolidated wheel radius value $R_{ic}$ for each predefined angular position $θ_i$ being calculated using the at least four wheel radius values $R_i$ calculated for each predefined angular position $θ_i$.

The wheel deformation controlling method according to the invention not only makes it possible to determine wheel deformations, but also to quantify these deformations and to evaluate the actual shape of the wheel. In particular, it makes it possible to determine the proper wheel radius $R_i$ for each predefined angular position $θ_j$.

The use of a sensor 14 comprising a gearwheel 20 and a sensing element 22 is particularly advantageous since it allows economical controlling of wheel deformations, since the sensor 14 is, for example, a component of a rail vehicle anti-lock brake system.

The calculation of the radius value using the filtered time difference $\Delta T_{filti}$ and in particular the use of a Hann window improves the accuracy of the calculation of wheel deformation 4.

The calculation of a consolidated wheel radius $R_{ic}$ also improves the accuracy of the wheel deformation calculation by excluding potential anomalies during measurement.

What is claimed is:

1. A method of detecting deformation of a wheel, the method comprising:
    while the wheel is rolling on a running surface, obtaining a parameter, for multiple predefined angular positions on the wheel, characterizing an angular velocity of the wheel when the wheel is in contact with the running surface at said predefined angular position; and
    calculating a radius value of the wheel for each predefined angular position using the parameter characterizing the angular velocity obtained for said angular position,
    wherein the parameter characterizing the angular velocity of the wheel is a direct time difference for the predefined angular position, the direct time difference is a time difference between detections of the edge of two teeth of a gear of the wheel,
    wherein the calculation of the radius value of the gear for said each predefined angular position uses a filtered time difference, wherein the filtered time difference is a weighted average of direct time differences for multiple predefined angular positions.

2. The method of detecting the deformation of the wheel according to claim 1, wherein the filtered time difference is calculated by weighting the direct time differences for multiple predefined angular positions by a Hann window.

3. The method of detecting the deformation of the wheel according to claim 1, wherein the calculation of a wheel radius value for each predefined angular position is the product of a predetermined wheel radius and the ratio between the direct time difference and the filtered time difference obtained for said predefined angular position.

4. The method of detecting the deformation of the wheel according to claim 1, with the method comprising calculating at least four wheel radius values for each predefined angular position, a consolidated wheel radius value for each predefined angular position being calculated using at least four wheel radius values calculated for each predefined angular position.

5. The method of detecting the deformation of the wheel according to claim 1, wherein the wheel is a wheel of a railway vehicle.

6. The method of detecting the deformation of the wheel according to claim 1, wherein the wheel is constructed using a rigid material.

7. The method of detecting the deformation of the wheel according to claim 1, further comprising:
    determining an actual shape of the wheel from the radius value of the wheel calculated for said each predefined angular position, the actual shape being a permanent outer shape along the peripheral edge of the wheel.

8. The method of detecting the deformation of the wheel according to claim 1, wherein the parameter characterizing the angular velocity of the wheel is a direct time difference for the predefined angular position, the direct time difference being the time difference between the detection of the edge of two consecutive teeth of the gearwheel.

9. The method of detecting the deformation of the wheel according to claim 1, wherein the parameter characterizing the angular velocity of the wheel is measured by a sensor, with the sensor comprising a gearwheel and a sensing element configured to detect an edge of each tooth of the gearwheel.

10. A device for detecting the deformation of a wheel, the device being arranged to be connected to a sensor configured to obtain, while the wheel is rolling on a running surface, for multiple predefined angular positions on the wheel, a parameter characterizing an angular speed of the wheel when the wheel is in contact with the running surface at said predefined angular position, the device comprising a calculation module of a radius value of the wheel for each predefined angular position using the parameter characterizing the angular speed obtained for said angular position,
    wherein the parameter characterizing the angular velocity of the wheel is a direct time difference for the predefined angular position, the direct time difference is a time difference between detections of the edge of two teeth of a gear of the wheel,
    wherein the calculation of the radius value of the gear for said each predefined angular position uses a filtered time difference, wherein the filtered time difference is a weighted average of direct time differences for multiple predefined angular positions.

11. A wheel deformation detecting system, in particular for use on board a rail vehicle, the wheel deformation detecting system comprising a sensor and the wheel deformation detecting device of claim 10 connected to the sensor.

12. A vehicle, in particular a railway vehicle, comprising at least one wheel and the wheel deformation detecting system according to claim 11.

* * * * *